(12) United States Patent
Li et al.

(10) Patent No.: US 9,961,186 B2
(45) Date of Patent: May 1, 2018

(54) ALARM REPORTING FAIL OVER MECHANISM

(71) Applicant: KONINKLIJKE PHILIPS N.V., Eindhoven (NL)

(72) Inventors: Jeff Li, Murrysville, PA (US); Pavan Reddy, Murrysville, PA (US); Tomas Russ, Murrysville, PA (US); Paul Baril, Murrysville, PA (US); Alan Brav, Murrysville, PA (US); Bin Wu, Murrysville, PA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 14/862,494

(22) Filed: Sep. 23, 2015

(65) Prior Publication Data

US 2016/0094704 A1    Mar. 31, 2016

Related U.S. Application Data

(60) Provisional application No. 62/055,329, filed on Sep. 25, 2014, provisional application No. 62/055,308, filed on Sep. 25, 2014, provisional application No. 62/055,279, filed on Sep. 25, 2014, provisional application No. 62/055,351, filed on Sep. 25, 2014.

(51) Int. Cl.
*G08B 1/08*   (2006.01)
*H04M 1/725*   (2006.01)
(Continued)

(52) U.S. Cl.
CPC ......... *H04M 1/72541* (2013.01); *G01S 19/01* (2013.01); *H04M 3/54* (2013.01); *H04M 3/56* (2013.01); *H04M 11/04* (2013.01); *H04W 4/005* (2013.01); *H04W 4/02* (2013.01);
*H04W 4/021* (2013.01); *H04W 4/04* (2013.01); *H04W 4/22* (2013.01); *H04W 24/04* (2013.01); *H04W 52/0241* (2013.01); *H04W 76/007* (2013.01); *H04M 2242/04* (2013.01);
(Continued)

(58) Field of Classification Search
CPC .............. H04M 1/72541; H04M 11/04; G08B 21/0446; G08B 25/016; G08B 21/0283; G08B 21/043
USPC ............ 340/539.11, 573.1; 455/404.1, 404.2
See application file for complete search history.

(56) References Cited

U.S. PATENT DOCUMENTS 6,725,044 B2   4/2004 Verma et al.
8,866,606 B1   10/2014 Will et al.
(Continued)

*Primary Examiner* — Toan N Pham

(57) ABSTRACT

A mobile button device (10) comprises a call button (12), a local wireless link (20) to a communicator (30), and a cellular connection (22). The mobile button device is programmed to perform an alarm reporting method including: originating an alarm by sending the alarm via the local wireless link to the communicator for alarm reporting by the communicator; after sending the alarm to the communicator, monitoring alarm reporting status via the local wireless link to the communicator; and reporting the alarm via the cellular connection in response to the monitoring determining that the communicator failed to report the alarm. For example, the monitoring may include polling the communicator via the local wireless link and the monitoring determines that the communicator failed to report the alarm if the polling indicates the communicator is unavailable (70) or a timeout condition (72) is reached.

19 Claims, 2 Drawing Sheets

(51) Int. Cl.
- *H04W 4/22* (2009.01)
- *H04W 24/04* (2009.01)
- *G01S 19/01* (2010.01)
- *H04W 4/04* (2009.01)
- *H04W 76/00* (2018.01)
- *H04W 4/02* (2018.01)
- *H04W 52/02* (2009.01)
- *H04M 3/54* (2006.01)
- *H04M 3/56* (2006.01)
- *H04W 4/00* (2018.01)
- *H04M 11/04* (2006.01)
- *H04W 84/04* (2009.01)
- *H04W 84/12* (2009.01)
- *H04W 88/06* (2009.01)

(52) U.S. Cl.
CPC .......... *H04W 84/042* (2013.01); *H04W 84/12* (2013.01); *H04W 88/06* (2013.01); *Y02B 60/50* (2013.01)

(56) References Cited

U.S. PATENT DOCUMENTS

| | | |
|---|---|---|
| 2009/0143047 A1 | 6/2009 | Hays et al. |
| 2009/0157835 A1 | 6/2009 | Thompson et al. |
| 2011/0059719 A1* | 3/2011 | Spielvogel ........... G08B 25/016 455/404.1 |
| 2011/0092237 A1 | 4/2011 | Kato et al. |
| 2013/0076510 A1* | 3/2013 | Bear ................... G08B 25/009 340/539.16 |
| 2013/0137450 A1 | 5/2013 | Dai et al. |
| 2013/0143519 A1* | 6/2013 | Doezema ........... G08B 21/0446 455/404.2 |
| 2013/0311554 A1 | 11/2013 | Mahajan |
| 2014/0142934 A1 | 5/2014 | Kim |
| 2014/0189001 A1 | 7/2014 | Tyagi et al. |
| 2014/0206307 A1 | 7/2014 | Maurer et al. |
| 2014/0274225 A1 | 9/2014 | Lacatus et al. |
| 2015/0254967 A1 | 9/2015 | Hyatt |
| 2016/0093197 A1* | 3/2016 | See ....................... G08B 25/10 340/539.12 |

* cited by examiner

ALARM REPORTING FAIL OVER MECHANISM

FIELD

The following relates generally to the Personal Emergency Response System (PERS) arts and related arts.

BACKGROUND

A Personal Emergency Response System (PERS) enables an elderly person or other person at elevated risk of incapacitating medical emergency to summon help. For example, a PERS may be activated by a person experiencing a debilitating fall, a heart attack, an acute asthma attack or other respiratory emergency, or so forth. The PERS typically includes a mobile button device in the form of a necklace-worn pendant, a bracelet, or the like. By pressing the call button of the mobile button device, a speakerphone console in the residence is activated, by which the at-risk person is placed into telephonic contact with a PERS response agent. The agent speaks with the calling person (hereinafter referred to as a PERS "subscriber" as the person subscribes with the PERS service, although any associated costs or fees may be paid by a medical insurance company or other third party), and takes appropriate action such as talking the subscriber through the problem, summoning emergency medical service (EMS), or dispatching a neighbor or other authorized person to check on the subscriber. The PERS architecture typically assumes a homebound subscriber (where "home" may be an individual residence, a group residence, an apartment, an assisted care facility, or so forth). In this architecture, the speakerphone console is connected with a telephone line (i.e. landline) thus providing a secure physical connection to the PERS call center.

A disadvantage of this architecture is that the PERS is only usable when the subscriber is in his or her residence. Another disadvantage is that the telephone line to which the speakerphone console is connected is preferably a dedicated line, which introduces additional installation costs and monthly telephone company fees. If the speakerphone console is instead connected to a telephone line that is also used by the subscriber and others in the residence for telephone calls or the like, then the possibility exists that the telephone line may be busy at the time the subscriber initiates an emergency call.

The following discloses a new and improved systems and methods that address the above referenced issues, and others.

SUMMARY

In one disclosed aspect, a mobile button device comprises a call button, a local wireless link to a communicator, and a cellular connection. The mobile button device is programmed to perform an alarm reporting method including: originating an alarm by sending the alarm via the local wireless link to the communicator for alarm reporting by the communicator; after sending the alarm to the communicator, monitoring alarm reporting status via the local wireless link to the communicator; and reporting the alarm via the cellular connection in response to the monitoring determining that the communicator failed to report the alarm. For example, the monitoring may include polling the communicator via the local wireless link and the monitoring determines that the communicator failed to report the alarm if the polling indicates the communicator is unavailable or a timeout condition is reached.

In another disclosed aspect, a device combination for reporting an alarm includes a mobile button device and a communicator. The mobile button device includes a call button, a local wireless link, and a cellular connection. The communicator is configured to be paired together with the mobile button device by the local wireless link. The communicator is programmed to receive an alarm originated by the mobile button device via the local wireless link and report the received alarm and provide an alarm reporting status to the mobile button device via the local wireless link. The mobile button device is programmed to originate the alarm by sending the alarm via the local wireless link to the communicator, monitor the alarm reporting status from the communicator via the local wireless link, and report the alarm via the cellular connection in response to determining from the monitored reporting status that the communicator failed to report the alarm.

In another disclosed aspect, an alarm method comprises originating an alarm at a mobile button device and communicating the alarm from the mobile button device to a communicator via a local wireless link pairing together the mobile button device and the communicator. At the communicator, an attempt is made to report the alarm via a telephone line connected with the communicator. At the mobile button device, alarm reporting status of the communicator is monitored via the local wireless link and, in response to the monitoring detecting failure of the communicator to report the alarm via the telephone line, a cellular connection of the mobile button device is operated to report the alarm.

In another disclosed aspect, an alarm method comprises: (i) originating an alarm at a mobile button device; (ii) communicating the alarm from the mobile button device to a communicator via a local wireless link pairing together the mobile button device and the communicator; (iii) at the communicator, reporting the alarm via a telephone line connected with the communicator; (iv) attempting to establish audio contact with the subscriber from a Personal Emergency Response System (PERS) via the communicator connected to the telephone line; and (v) If the attempt (iv) to establish audio contact via the communicator fails, calling the mobile button device via a cellular connection and a built-in speaker and microphone of the mobile button device.

One advantage resides in providing redundant mechanisms for reporting a medically or safety related alarm originating at a mobile button device.

Another advantage resides in facilitating use of a common telephone line for alarm reporting that also services general telephonic activity, while retaining high connectivity reliability for the alarm reporting.

Another advantage resides in enabling alarm reporting in the residence even when the connected telephone line is unavailable (e.g. dead or busy).

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

In illustrative embodiments described herein, the at-risk person served by the medical or safety alarm reporting system is referred to as a "subscriber". This recognizes that the at-risk person subscribes with the PERS service so that the subscriber's mobile button device and linked communicator are associated with the service and appropriate subscriber data are stored at the server and made available to a service agent handling a call from the subscriber. It is to be understood that the term "subscriber" has no further connotation—for example, any costs or fees associated with the subscription may be paid by the subscriber, or by a medical insurance company, or by a governmental agency, or by some other third party.

Terminology such as "home" or "residence" merely connotes the location where the alarm reporting communicator is installed. The home or residence may, by way of non-limiting example, be an individual residence, a group residence, an apartment, an assisted care facility, or so forth.

Figure 1:
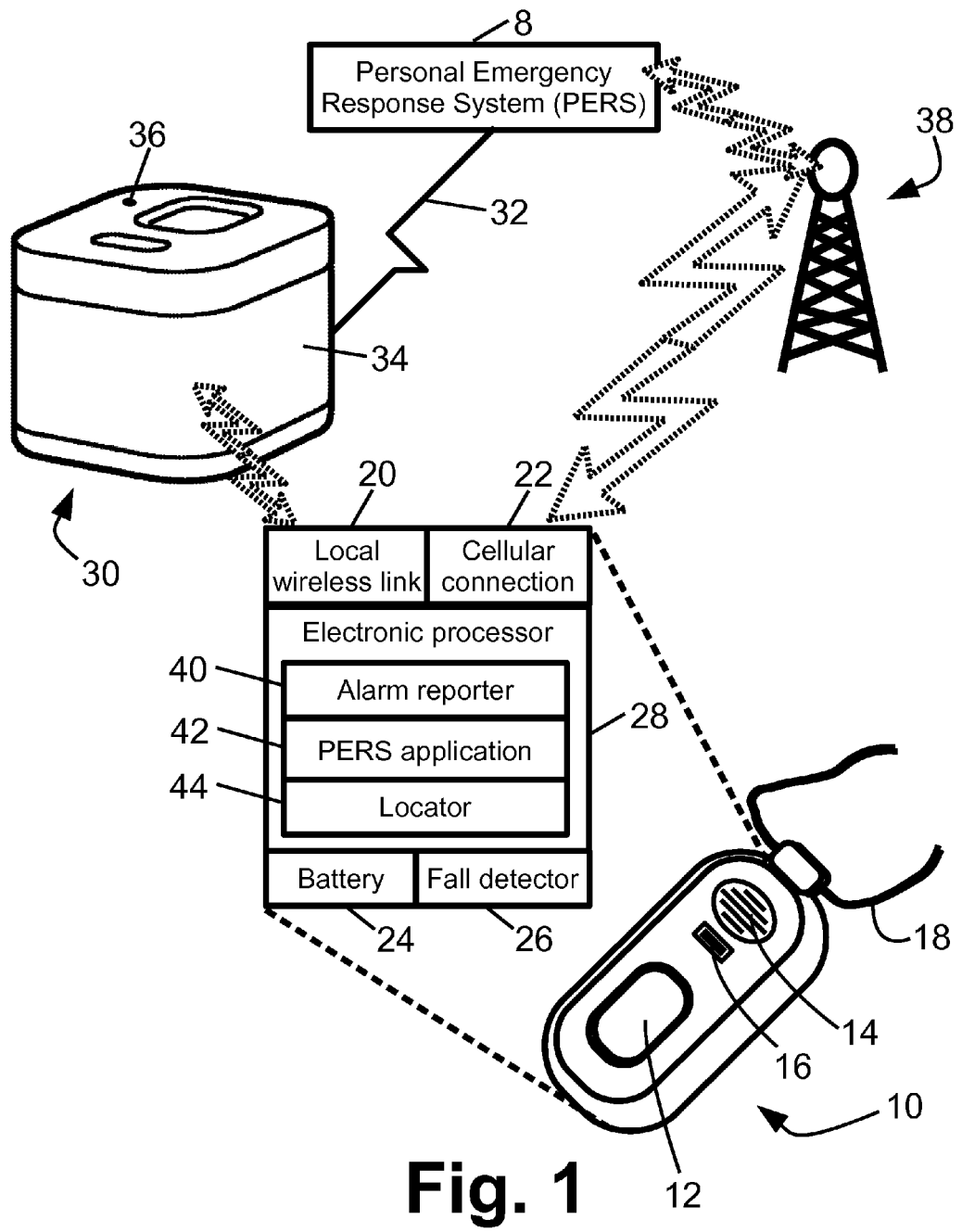
FIG. 1 diagrammatically illustrates a robust alarm reporting system employing a mobile button device and a communicator as disclosed herein.

With reference to FIG. 1, an illustrative alarm reporting service provides service both in the subscriber residence and when the subscriber is away from the residence. In illustrative FIG. 1, the alarm is reported to a Personal Emergency Response System (PERS) 8, which is diagrammatically represented in FIG. 1 and may include, by way of illustration, a call center staffed by response agents each having an electronic work station including a computer on which a subscriber's profile may be displayed and telecommunication equipment such as a headset via which the agent can converse with a subscriber. In other embodiments, the alarm may be reported to a local Emergency Response Service (EMS), or to a relative or a neighbor serving as a visiting caregiver for the subscriber.

The subscriber carries or wears a wearable mobile button device 10 which includes a call button 12 for triggering an alarm and optionally other features such as a built-in speaker 14 and microphone 16. The illustrative wearable mobile button device 10 is a pendant that is worn around the neck via a necklace 18 (shown in part). More generally, the wearable mobile button device is a unitary device that can have any suitable wearable form factor, such as the illustrative necklace-worn pendant, or a bracelet or wristband mount, or so forth, and includes simple and effective mechanism such as the illustrative push button 12 for triggering a call to a PERS call center. The mobile button device 10 is suitably battery-powered to enable complete portability. The call button 12 is suitably a (preferably large) push button 12, although other call button topologies are contemplated. It is also contemplated to provide a wearable mobile button device that automatically triggers an alarm based on certain input. For example, the wearable mobile button device 10 may include an accelerometer-based fall detector that triggers an alarm upon the accelerometer detecting a fall event, e.g. a rapid downward acceleration indicative of a sudden fall. The mobile button device 10 optionally has other attributes such as optionally being waterproof so it can be worn in a bath or shower. Because the mobile button device 10 is designed to be operated by the subscriber under duress possibly including compromised physical or mental agility, the mobile button device 10 is preferably designed to minimize operational complexity and likelihood of operator error. For example, in some embodiments the mobile button device 10 includes only the call button 12 and no other user controls, and the call button 12 is preferably large with a tactile surface to facilitate its activation by the subscriber even if the subscriber's hand is trembling or the subscriber has vision difficulty, pain, or is otherwise debilitated.

FIG. 1 diagrammatically illustrates internal components of the mobile button device 10, including local wireless link 20, a cellular connection 22, a battery 24, an accelerometer-based fall detector 26, and an electronic processor 28 (e.g. a microprocessor or microcontroller). It will be appreciated that these various components may be variously integrally formed and/or mounted separately or as combined units in the housing of the mobile button device 10. For example, various groups of components 20, 22, 26, 28 may be commonly mounted as a hybrid integrated circuit, monolithic integrated circuit, or so forth. The local wireless link 20 may be suitably implemented as a WiFi radio, a dedicated 900 MHz radio, or so forth. The cellular connection 22 may be implemented as a 3G, 4G, 5G or other cellular radio, or other cellular radio communicating by connecting with geographically distributed cellular towers.

The local wireless link 20 is configured to pair the mobile button device 10 with a communicator 30, using a short range wireless communication protocol such as WiFi, a dedicated 900 MHz link, or so forth. The communicator 30 is located in the residence and is connected with the PERS or other alarm response service 8 (e.g. with a service call center) via a reliable communication link 32 such as a telephone landline, i.e. telephone line 32. The local wireless link 20 has a range approximately coinciding with the spatial extent of the residence (and possibly its immediate environs, e.g. extending to encompass a neighboring house or an apartment floor above or below a residence apartment or so forth). Although the local wireless link 20 preferably provides coverage for the entire residence, it is contemplated that in some instances the short range communication may fail to provide such complete coverage and there may, for example, be one or two rooms of a large house that are not covered by the local wireless link 20.

The communicator 30 optionally includes a speaker 34 and a microphone 36 enabling the communicator 30 to serve as a speakerphone console via which a service agent handling an alarm can directly speak with the subscriber. To this end, the communicator 30 employs the telephone line 32. In other contemplated embodiments, the speakerphone capability (speaker 34 and microphone 36) is omitted and the communicator merely reports the alarm via the telephone line 32.

The cellular connection 22 is configured to wirelessly communicate with a cellular network, e.g. a cellular telephone (cellphone) network. This is diagrammatically indicated in FIG. 1 as communication between the cellular 22 and a cellular tower (i.e. cell tower) 38. The cellular connection 22 of the mobile button device 10 provides alarm reporting service to the subscriber when the subscriber (or more particularly the mobile button device 10) is out-of-range of the in-residence communicator 30. For embodiments in which the service is designed to provide direct telephonic communication between the agent handling the alarm and the subscriber, it will be appreciated that the agent cannot leverage the speaker 34 and microphone 36 of the communicator 30 for this purpose when the subscriber is out of range of the communicator 30. In such embodiments, the built-in speaker 14 and microphone 16 of the mobile button device 10 is used to handle a mobile telephone call with the agent via the cellular connection 22.

The electronic processor 28 of the mobile button device 10 is programmed to execute an alarm reporting application or method 40 which detects an alarm trigger such as operation of the call button 12 or detection of a fall event by the fall detector 26, and reports the alarm to the PERS 8 or other alarm handling individual or service. Some suitable embodiments of the alarm reporter 40 are described in further detail later herein with reference to FIG. 2. The electronic processor 28 optionally further executes a PERS application 42 which interacts with the PERS 8 to provide assistance to the subscriber to handle the alarm. For example, the PERS application 42 may initiate or receive a mobile telephone call with the PERS agent handling the alarm and conduct the mobile telephone call using the built-in speaker 14 and microphone 16 of the mobile button device 10. (By contrast, in embodiments providing such telephonic communication, when in-residence this conversation is conducted by the communicator 30 using its speaker 34 and microphone 36).

The illustrative alarm reporting architecture described herein does not assume a homebound subscriber. Rather, alarm reporting service continues to be provided even when the subscriber leaves the residence, via the cellular connection 22. However, this raises an issue if the agent wishes to send assistance to the subscriber's location, since the agent cannot assume the subscriber is located at the residence. Accordingly, the illustrative mobile button device 10 further includes one or more locator services 44. For example, the locator service(s) 44 may include a Global Positioning System (GPS) receiver. In another embodiment, GPS data (if GPS satellite reception is available) and/or information on in-range cellular towers (such as illustrative tower 38) and/or WiFi access points (APs, if the local wireless link 20 includes WiFi) are provided to a global locator service such as Skyhook™ (Boston, Mass., USA) via the cellular connection 22, and the global locator service correlates detected cell towers and/or APs with geographical location and combines this with the GPS data to provide a robust location assessment.

In the following, some illustrative embodiments of the alarm reporter 40 are described. In general, when the communicator 30 cannot report the alarm for any reason, the mobile button device 10 reports the alarm itself. Thus, no single communication method is relied upon to report alarms. When the mobile button device 10 originates an alarm, it first sends it to the communicator 30 and start checking the reporting status by polling the communicator 30 via the local wireless link 20. If the communicator 30 cannot report the alarm for any reasons such as the telephone line 32 being unavailable (e.g. dead or busy), it indicates such reporting status when polled by the mobile button device 10. If the communicator 30 cannot report alarm after (for example) 12 polls (~3 minutes if the polling is performed every 15 seconds), the mobile button device 10 goes ahead and reports the alarm itself using its cellular connection 22.

Figure 2:
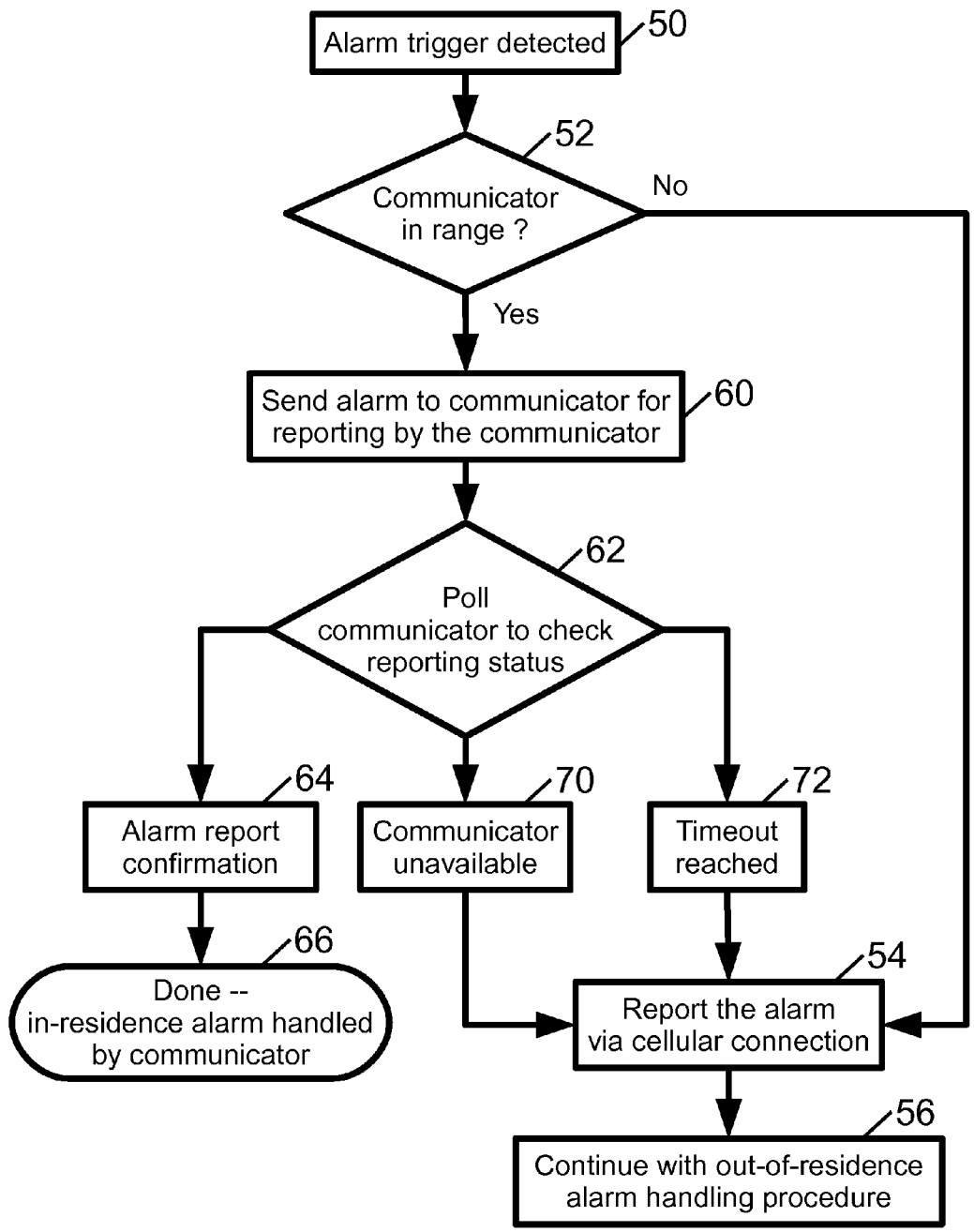
FIG. 2 diagrammatically illustrates an alarm reporting method suitably performed by the mobile button device of FIG. 1.

With reference now to FIG. 2, an alarm reporting method suitably performed by the mobile button device 10 of FIG. 1 is described. In an operation 50, an alarm trigger is detected. This may be, for example, detection of activation of the call button 12, or detection of a fall event by the accelerometer-based fall detector 26. The detection of an alarm trigger causes the mobile button device 10 to originate an alarm. In an operation 52, it is determined whether the communicator 52 is in range, that is, whether the mobile button device 10 can communicate with the communicator 52 via the local wireless link 20. (Thus, not being "in range" in this context encompasses either being spatially out of range, i.e. the mobile button device 10 being too far away from the communicator 30 for the local wireless link 20 to operate, or being out-of-range due to a technical problem, e.g. a failure of the local wireless link 20). The operation 52 can be performed, for example, by sending a message to the communicator 30 via the local wireless link 20 and detecting whether an acknowledgement message is received from the communicator 30 via the local wireless link 20 in reply. If the communicator 30 is not in range, then the alarm is reported by the mobile button device 10—to this end, flow passes to an operation 54 in which the mobile button device 10 reports the alarm (e.g. to the PERS 8 or to some other alarm handling service) via the cellular connection 22. In this situation, the communicator 30 is out-of-range and hence unavailable to handle the alarm, and so in an operation 56 the mobile button device 10 follows the reporting operation 54 by continuing with an out-of-residence alarm handling procedure in an operation 56. This out-of-residence alarm handling procedure may include, by way of illustration, sending the location determined by the locator service(s) 44 to the PERS 8, and/or conducting a mobile telephone call at the mobile button device 10 via the cellular connection 22 following the reporting operation 54. The mobile telephone call is suitably conducted using the speaker 14 and microphone 16 of the mobile button device 10.

With continuing reference to FIG. 2, if on the other hand at operation 52 it is determined that the communicator 52 is in range, then flow passes to an operation 60 in which the alarm is sent from the mobile button device 10 to the communicator 30 via the local wireless link 20 for reporting by the communicator 30 via the telephone line 32. The communicator 30 then attempts to report the alarm to the PERS 8 via the telephone line 32. This is expected to be successful since the telephone line 32 is generally reliable—however, it could be unsuccessful if, for example, the telephone line 32 is unavailable, e.g. dead or busy (in the case of a common telephone line that is also used for general telephone communications). To determine whether the communicator 32 is able to successfully report the alarm, the mobile button device 10 polls the communicator via the local wireless link 20 in an operation 62 to check the alarm reporting status. If the communicator returns an alarm report confirmation 64 in response to a poll of the communicator 32 then, as indicated by diagrammatic block 66, the alarm reporting process is complete from the standpoint of the mobile button device 10. With the alarm reported by the communicator 30, it is known that the subscriber is in the residence and hence it is expected that the in-residence alarm will be handled by the communicator 30, e.g. by conducting a telephone call between the subscriber and a PERS agent via the telephone line 32 using the speaker 34 and microphone 36 of the communicator 30.

On the other hand, the response of the communicator 30 to the poll 62 may be the status 70 that the communicator 30 is unavailable. Such unavailable status is typically due to unavailability of the telephone line 32, although it could be due to some other problem such as an internal problem with the communicator 30 or a problem with landline call handling at the PERS 8. In general, The status of "unavailable" 70 encompasses any detected condition that prevents the communicator 30 from reporting the alarm via the telephone line 32. If the communicator 30 reports its status as "unavailable" 70 in response to the poll operation 62, then flow passes to the operation sequence 54, 56 which has already been described. The mobile button device 10 reports the alarm itself using the cellular connection 22 in the operation 54 and performs any subsequent alarm handling at the mobile button device 10 in the operation 56. The mobile button device 10 takes over the reporting 54 and handling 56 of the alarm in response to the unavailable status 70 of the communicator 30.

In some cases, the communicator 30 may report an alarm reporting status such as "waiting" to indicate that it has transmitted the alarm report via the telephone line 32, but has not yet received confirmation from the PERS 8 (or other alarm receiving service) that the reported alarm has been received. As another possibility, the communicator 30 may fail to respond to the poll operation 62 at all. In such cases, the polling operation 62 is optionally repeated one or more times. More generally, the polling operation 62 is repeated until a timeout condition 72 is reached. For example, the timeout 72 may be a certain number of repetitions of the polling operation 62 (e.g. 12 repetitions in one illustrative embodiment), or the timeout 72 may be specified as a time interval, e.g. the polling operation 62 may be repeated for 3 minutes. In some embodiments, the timeout 72 may be reached after a single iteration of the polling operation 62 (that is, no repetitions) with no response to the polling being provided by the communicator 30. When the timeout 72 is reached without receiving an alarm report confirmation 64, flow again passes to the operation sequence 54, 56 which has already been described. The mobile button device 10 reports the alarm itself using the cellular connection 22 in the operation 54 and performs any subsequent alarm handling at the mobile button device 10 in the operation 56. The mobile button device 10 takes over the reporting 54 and handling 56 of the alarm in response to the timeout condition 72 being reached, under the assumption that the communicator 30 or the telephone line 32 is experiencing some problem that is preventing alarm reporting by the communicator 30.

An advantage of the alarm reporting system described with reference to FIGS. 1 and 2 is that it can provide alarm reporting both in-residence via the communicator 30 and out-of-residence via the cellular connection 22. However, it will be appreciated that the system of FIGS. 1 and 2 can also be advantageously applied in the context of a homebound or shut-in subscriber who is unable to leave the residence. In this situation, the mobile button device 10 is always within geographical range of the communicator 30. Nonetheless, the cellular connection 22 and the alarm reporter 40 still provides a substantial advantage in that it provides a redundant alarm reporting pathway in the event that the communicator 30 is unable to report an alarm. For example, if the local wireless link 20 fails for some technical reason, this is detected in the operation 52 of FIG. 2 leading to the alarm being reported in operation 54 and handled in operation 56. If the local wireless link 20 is working so that the alarm is sent to the communicator via the operation 60, but the connection between the communicator 30 and the PERS 8 is unavailable for some reason such as the telephone line 32 being dead or busy, then this is detected as an unavailable status 70 or due to reaching the timeout 72, again leading to the alarm being reported in operation 54 and handled in operation 56. Another advantage is that the PERS response agent can communicate with the subscriber even if the subscriber is in radio frequency communication range of the communicator 30 but is not in audio range (such as in the bathroom, while the communicator 30 is in the living room, so that the subscriber may not be able to hear the speaker 34 and/or the microphone 36 may not be able to pick up the subscriber's voice). In that case, the PERS response agent can call the subscriber directly via the cellular connection 22 and can converse via the built-in speaker and microphone 14, 16 of the mobile button device 10.

It will be further appreciated that the disclosed cellular connection 22 and the alarm reporter 40 has the advantage of providing robustness against occasional loss of availability of the telephone line 32, since in such cases the wireless connection 22 can be used by the mobile button device 10 to directly report the alarm. This can facilitate using the same telephone line both as the telephone line 32 to which the communicator 30 is connected and also as a general-purpose telephone line for making occasional telephone calls. This in turn can reduce installation costs by removing the need to install a separate dedicated telephone line for connecting the communicator 30, and can reduce monthly costs by removing the additional fee charged by the telephone company for providing telephone service to the separate telephone line.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A mobile button device comprising:
 a call button;
 a local wireless link to a communicator; and
 a cellular connection;
 wherein the mobile button device is programmed to perform an alarm reporting method including:
  originating an alarm by sending the alarm via the local wireless link to the communicator for alarm reporting by the communicator;
  after sending the alarm to the communicator, monitoring alarm reporting status by polling the communicator via the local wireless link to the communicator; and
  reporting the alarm via the cellular connection in response to the monitoring determining that the communicator failed to report the alarm by determining the communicator is unavailable or a timeout condition is reached.

2. The mobile button device of claim 1 wherein the timeout condition is one of a predetermined time interval and a predetermined number of polls.

3. The mobile button device of claim 1 wherein origination of the alarm is triggered by an activation of the call button.

4. The mobile button device of claim 1 wherein origination of the alarm is triggered by detection of a fall event by an accelerometer-based fall detector.

5. The mobile button device of claim 1 wherein the mobile button device includes no other user control besides the call button.

6. The mobile button device of claim 1 wherein the communicator is connected with a Personal Emergency Response System (PERS) to report the alarm to the PERS and wherein: the mobile button device is programmed to report the alarm via the cellular connection to the PERS in response to the monitoring determining that the communicator failed to report the alarm to the PERS.

7. The mobile button device of claim 6 further comprising:
a speaker and microphone built into the mobile button device, wherein the mobile button device is programmed to use the speaker and microphone to conduct a mobile telephone call with the PERS via the cellular connection following reporting the alarm via the cellular connection.

8. The mobile button device of claim 1 comprising a necklace-worn pendant or a bracelet.

9. A device combination for reporting an alarm, the device combination comprising:
a mobile button device including a call button, a local wireless link, and a cellular connection; and
a communicator configured to be paired together with the mobile button device by the local wireless link;
the communicator being programmed to receive an alarm originated by the mobile button device via the local wireless link and report the received alarm and provide an alarm reporting status to the mobile button device via the local wireless link; and
the mobile button device being programmed to originate the alarm by sending the alarm via the local wireless link to the communicator, monitor the alarm reporting status from the communicator via the local wireless link, and report the alarm via the cellular connection in response to determining from the monitored reporting status that the communicator failed to report the alarm, which is determined in response to reaching a timeout without the alarm reporting status from the communicator indicating an alarm report confirmation.

10. The device combination of claim 9 wherein the communicator is configured for connection to a telephone line and is programmed to report the received alarm via the telephone line.

11. The device combination of claim 10 wherein:
the mobile button device includes a built-in speaker and microphone configured to conduct a mobile telephone call via the cellular connection following reporting the alarm via the cellular connection; and
the communicator includes a speaker and microphone configured to conduct a telephone call via the telephone line following reporting the received alarm via the telephone line.

12. The device combination of claim 10 wherein the mobile button device is programmed to report the alarm via the cellular connection in response to the alarm reporting status from the communicator indicating the telephone line is unavailable.

13. The device combination of claim 9 wherein the mobile button device is configured to originate an alarm in response to a pressing of the call button.

14. The device combination of claim 9 wherein the mobile button device is configured to originate an alarm in response to an accelerometer-based fall detector detecting a fall event.

15. An alarm method comprising:
originating an alarm at a mobile button device;
communicating the alarm from the mobile button device to a communicator via a local wireless link pairing together the mobile button device and the communicator;
at the communicator, attempting to report the alarm via a telephone line connected with the communicator;
at the mobile button device, monitoring alarm reporting status of the communicator via the local wireless link and, in response to the monitoring detecting failure of the communicator to report the alarm via the telephone line, operating a cellular connection of the mobile button device to report the alarm.

16. The alarm method of claim 15 wherein the originating comprises detecting operation of a call button of the mobile button device.

17. The alarm method of claim 15 wherein the monitoring detects failure of the communicator to report the alarm via the telephone line as one of:
an alarm reporting status indicating the telephone line is unavailable, and
the monitoring reaching a timeout condition without the alarm reporting status confirming the communicator has succeeded in reporting the alarm via the telephone line.

18. The alarm method of claim 15 further comprising one of:
(i) conducting a telephone call at the communicator via the telephone line following successful reporting of the alarm, the telephone call using a speaker and microphone of the communicator; and
(ii) conducting a mobile telephone call at the mobile button device via the cellular connection following reporting the alarm by operating the cellular connection of the mobile button device, the mobile telephone call using a speaker and microphone of the mobile button device.

19. An alarm method comprising:
(i) originating an alarm at a mobile button device;
(ii) communicating the alarm from the mobile button device to a communicator via a local wireless link pairing together the mobile button device and the communicator;
(iii) at the communicator, reporting the alarm via a telephone line connected with the communicator;
(iv) attempting to establish audio contact with the subscriber from a Personal Emergency Response System (PERS) via the communicator connected to the telephone line; and
(v) If the attempt (iv) to establish audio contact via the communicator fails, calling the mobile button device via a cellular connection and a built-in speaker and microphone of the mobile button device.

* * * * *